United States Patent [19]
Puyenbroek et al.

[11] Patent Number: 5,980,714
[45] Date of Patent: Nov. 9, 1999

[54] METHOD FOR MAKING POLYETHERIMIDE FIBER COMPOSITES

[75] Inventors: Robert Puyenbroek, Bergen op Zoom, Netherlands; Uwe Siegfried Wascher, Brasschaat, Belgium

[73] Assignee: General Electric Company, Pittsfield, Mass.

[21] Appl. No.: 09/127,021

[22] Filed: Jul. 31, 1998

[51] Int. Cl.⁶ ................................................. C25D 13/06
[52] U.S. Cl. ............................................ 204/499; 204/486
[58] Field of Search ................................. 204/499, 486

[56] References Cited

U.S. PATENT DOCUMENTS

| | | | |
|---|---|---|---|
| 3,803,085 | 4/1974 | Takekoshi et al. | 260/46.5 E |
| 3,814,869 | 6/1974 | De Luca | 179/175 |
| 3,847,867 | 11/1974 | Heath et al. | 260/47 CP |
| 3,850,885 | 11/1974 | Takekoshi et al. | 260/47 CZ |
| 3,852,242 | 12/1974 | White | 260/47 CZ |
| 3,855,178 | 12/1974 | White et al. | 260/47 CZ |
| 3,905,942 | 9/1975 | Takekoshi et al. | 260/47 CP |
| 3,972,902 | 8/1976 | Heath et al. | 260/346.3 |
| 3,983,093 | 9/1976 | Williams, III et al. | 260/47 CP |
| 4,455,410 | 6/1984 | Giles, Jr. | 525/436 |

OTHER PUBLICATIONS

Plastics, Rubber and Composites Processing and Applications by M. Hou, Lin Ye & Yiu–Wing Mai, vol. 23, No. 5, 1995, pp. 279–293, no month available.

Carbon Fiber Polyetherimide Composites, Journal of Reinforced Plastics and Composites, vol. 15, p. 117, 1996, no month available.

*Primary Examiner*—Kishor Mayekar

[57] ABSTRACT

A cataphoretic electrodeposition process for forming a fiber polyetherimide composite using a stable emulsion comprising a polyetherimide resin, neutralization agent, cosolvent, solvent, ring opening agent, and water. The fibers and an anode are place in the emulsion, a current is applied, and the polyetherimide coats the fibers.

24 Claims, No Drawings

METHOD FOR MAKING POLYETHERIMIDE FIBER COMPOSITES

FIELD OF THE INVENTION

The invention relates to polyetherimide fiber compositions, and especially relates to polyetherimide fiber compositions made via a cataphoretic electrodeposition process.

BRIEF DESCRIPTION OF THE RELATED ART

Polyetherimide resins have been applied to substrates utilizing various techniques including anoinic electrodeposition. Generically, anionic, also known as anodic, electrodeposition chemically combines resin R with ion forming group, e.g., —COOH, to form acidic resin RCOOH, which reacts bases to form macro-ions RCOO— for anodic deposition. Essentially, two electrodes inserted into an aqueous dispersion of film forming macro-ions (RCOO—) and counter ions ($Y^+$) cause water insoluble resin (RCOOH) to deposit on the positive electrode (anode), while water soluble YOH forms on the negative electrode (cathode). During this process metal ions freed from the substrate enhance the precipitation of the polyanion.

$$ROOH + YOH \text{ aq.} \rightarrow RCOO— + Y^+ + H_2O$$

where:
ROOH is the resin
YOH=external solubilizer
RCOO—=film forming macro-ions
$Y^+$=counter ions
and the electrode reactions are:

$$2H^+ + 2OH— \rightarrow H_2O + O + 2H^+ + 2e^- + RCOO— \rightarrow RCOOH$$

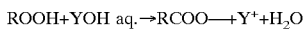

The disadvantages of this process range from the dissolution of the metal substrate, need for corrosion protection pretreatment, discoloration caused by metal ions to sensitivity to alkali due to non-consumed carboxylic groups (—COOH).

Unlike anodic electrodeposition, cathodic electrodeposition produces a product with no dissolution of the substrate, no staining, and better alkali resistance. This process employs the polycation, typically converting tertiary amines ($NR_3$) to cations ($NR_4^+$) using aqueous acid and electrode reaction.

$$R_3N + HX \rightarrow R_3NH^+ + X$$

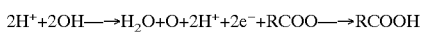

where:
$R_3N$=water insoluble oligomer
HX=external solubilizer
$R_3NH^+$=film forming macro-ions
X=counter ions Although cathodic electrodeposition solves some of the problems of anodic electrodeposition, this process has not been commercially viable for polyetherimide compositions due to poor emulsion stability, limited storage abilities, solvent toxicity and irritating odor, and low throwing power, i.e., the ability of the coating to uniformly coat remote areas of a substrate with the desired thickness, resulting in limited consistent layer thickness.

Coating processes for fiber components, particularly coatings with polyetherimide, have proven to be exceptionally difficult with complex geometries, i.e., hollow or complex substrates. Typically complex and hollow components are based upon thermoset materials, such as unsaturated polyesters and epoxy resins, having a high glass temperature because of the need for complete impregnation of the fibers in order to produce a substantially void-free composite, whereby complete impregnation is only attained with low viscosity polymers. However, the brittle nature of the thermoset systems, low damage tolerance of the components, and the limitations relating to recycling force the industry to utilize thermoplastics having difficult production requirements. Consequently, conventional processes for forming polyetherimide carbon fiber composites have been limited to two dimensional, regular surfaces. Furthermore, these processes, the melt process, dry powder process, and solution process, typically employ toxic or otherwise environmentally harmful chemicals or processes which require expensive secondary operations and long cycle times.

The melt process comprises applying a molten thermoplastic material to the fibers by either using a cross-head extruder which feeds the molten material to a die directed through which the fibers pass, or the fibers pass through a molten material bath. Disadvantages of this process include fiber damage caused by the forces exerted on the fibers during processing and difficulty in impregnating in small quantities and in homogeneously impregnating tightly held fibers.

The dry powder process comprises sintering very fine, low particle size thermoplastic material into the fibers. This process requires long cycle times and expensive secondary operations such as grinding procedures to obtain sufficiently small polymer particles.

In the solution process, the fibers are impregnated with a low viscosity solution of the thermoplastic polymer. With this process, during composite consolidation, the volatilizing solvent, which should be recycled, can form voids.

With the melt process, dry powder process, and solution process, once the fibers were coated with the thermoplastic polymer to form a pre-preg, a typical thermoforming process, such as vacuum/pressure molding, hydroforming, stamp forming, and autoclave forming, would then be employed to convert the fabricated pre-preg into complex shapes.

A precise overview of the different processes in fabricating pre-pregs and composites is given by M. Hou, Lin Ye & Yiu-Wing May in "Plastics, Rubber and Composites Processing and Applications", vol. 23, No. 5, 1995, pp. 279–293, and references in this publication. M. Hou et al. also report results on the influence of processing on properties of "Carbon Fiber Polyetherimide Composites," Journal of Reinforced Plastics and Composites, Vol. 15, p. 117, 1996.

What is needed in the art is a cost effective, simplified, environmentally friendly process for forming complex geometry fiber reinforced polyetherimide composites.

SUMMARY OF THE INVENTION

The present invention relates to a cataphoretic electrodeposition process for forming polyetherimide coated fibers. This process comprises: forming a polyetherimide emulsion, comprising the steps of: dispersing a polyetherimide resin in a solvent and a substantially water insoluble cosolvent, said polyetherimide resin having anhydride groups; reacting a ring opening agent with said anhydride groups, wherein amine groups are formed; neutralizing said amine groups with a neutralization agent to form a quaternized mixture; forming the polyetherimide emulsion by adding water to said quaternized mixture; inserting an anode into said emulsion; inserting fibers into said emulsion, wherein said fiber preform functions as a cathode; applying an electrical current to said emulsion; forming a polyetherimide cation; and reacting said polyetherimide cation at said cathode to form a polyetherimide species which coats said fibers.

DETAILED DESCRIPTION OF THE INVENTION

In a preferred embodiment, the fibers are cataphoretically coated in a polyetherimide emulsion which comprises, polyetherimide resin, a ring opening agent, a neutralization agent, a solvent, a cosolvent, and water. The coating process comprises dissolving the polyetherimide in solvent, adding the cosolvent, opening anhydride groups with the ring opening agent, quaternizing the amine groups with the neutralization agent, and finally adding water to form the aqueous polyetherimide emulsion. The fibers and an anode are then placed in the emulsion, a current is applied, and the polyetherimide reacts to coat the fibers.

The emulsion comprises up to about 10 volume percent (vol %) polyetherimide resin, up to about 5 vol % ring opening agent, up to about 5 vol % neutralization agent, up to about 20 vol % solvent, and up to about 20 vol % cosolvent, balance water, with about 3 vol % to about 8 vol % polyetherimide resin, about 0.2 vol % to about 3 vol % ring opening agent, about 0.3 vol % to about 3.5 vol % neutralization agent, about 8 vol % to about 15 vol % solvent, and about 9 vol % to about 15 vol % cosolvent, balance water preferred, and about 4 vol % to about 7 vol % polyetherimide resin, about 0.5 vol % to about 1.5 vol % ring opening agent, about 0.5 vol % to about 2 vol % neutralization agent, about 10 vol % to about 13 vol % solvent, and about 10 vol % to about 12.5 vol % cosolvent, balance water especially preferred.

Polyetherimide resins suitable for use as the polyetherimide resin component of the emulsion of the present invention are known compounds whose preparation and properties have been described, see generally, U.S. Pat. Nos. 3,803,085 and 3,905,942, the respective disclosures of which are incorporated herein by reference.

In a preferred embodiment, the polyetherimide resin component of the present invention contains from greater than 1 to 1000 or more, preferably from 10 to 1000, structural units of the formula (I):

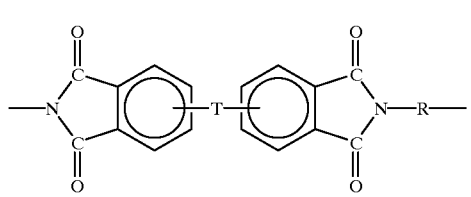
(I)

wherein the divalent T moiety bridges the 3,3', 3,4', 4,3', or 4,4' positions of the aryl rings of the respective aryl irnide moieties of formula (I); T is —O— or a group of the formula —O—Z—O—; Z is a divalent radical selected from the group consisting of formulae (II):

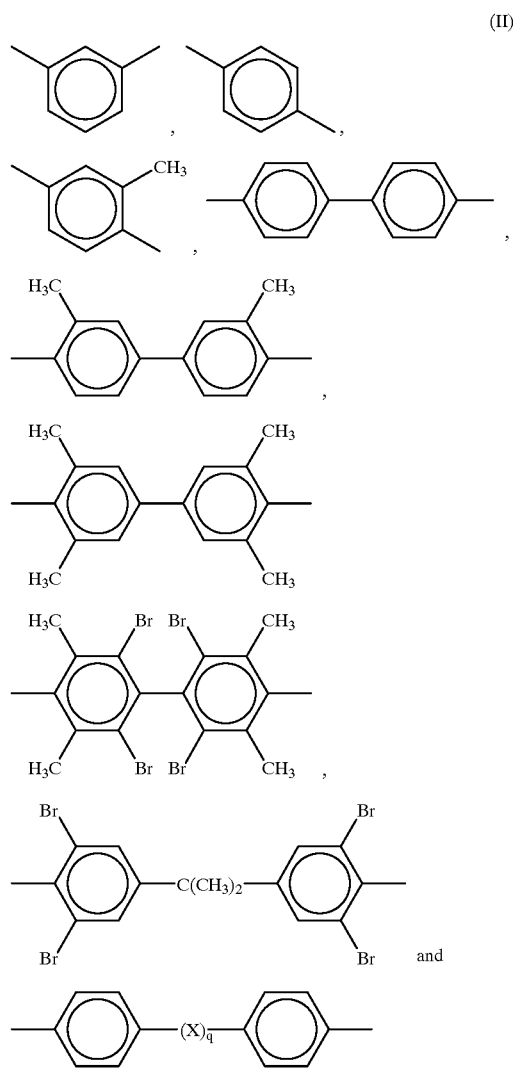

wherein X is a member selected from the group consisting of divalent radicals of the formulae (III):

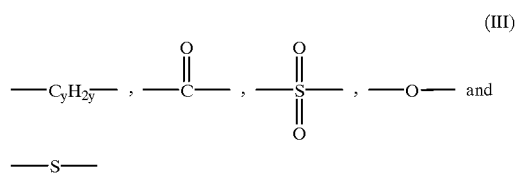

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV): (IV)

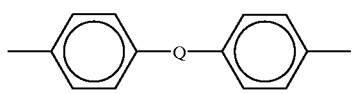

(IV)

where Q is a member selected from the group consisting of formulae (V):

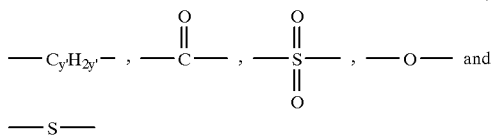

(V)

where y' is an integer from about 1 to about 5.

In one embodiment, the polyethermide resin may be a copolymer which, in addition to the etherimide units described above, further contains polyimide repeating units of the formula (VI):

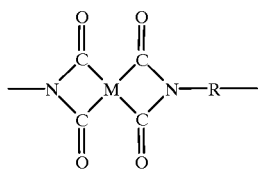

(VI)

wherein R is as previously defined for formula (I) and M is selected from the group consisting of formula (VII):

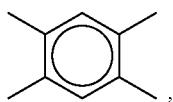

(VII)

formula (VIII):

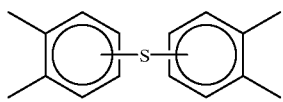

(VIII)

and formula (IX):

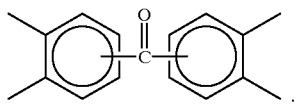

(IX)

Polyetherimide resins are made by known methods, such as, for example, those disclosed in U.S. Pat. Nos. 3,847,867, 3,814,869, 3,850,885, 3,852,242 3,855,178 and 3,983,093, the disclosures of which are hereby incorporated herein by reference.

In a preferred embodiment, the polyetherimide resin is made by the reaction of an aromatic bis(ether anhydride) of the formula (X):

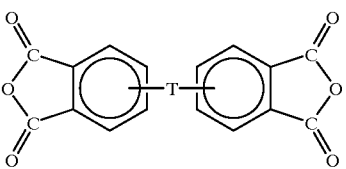

(X)

with an organic diamine of the formula (XI):

$$H_2N-R-NH_2 \quad (XI)$$

wherein T and R are defined as described above in formula (I). In general the reactions can be carried out employing well-known solvents, for example, o-dichlorobenzene, m-cresol/toluene and the like to effect interaction between the anhydride of formula (X) and the diamine of formula (XI), at temperatures from about 100° C. to about 250° C.

Alternatively, the polyethermide resin can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (X) include: 2,2-bis(4-(3,4-dicarboxyphenoxy) phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis ([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3, 4dicarboxyphenoxy)diphenyl-2,2-propane dianhydride; 4-(2,3-dicarboxyphenoxy)4'-(3,4-dicarboxyphenoxy) diphenyl ether dianhydride; 4-(2,3-dicarboxyphenoxy)-4'-(3,4-dicarboxyphenoxy)diphenyl sulfide dianhydride; 4-(2, 3-dicarboxyphenoxy)-4'-(3,4-dicarboxyphenoxy) benzophenone dianhydride and 4-(2,3-dicarboxyphenoxy) 4'-(3,4-dicarboxyphenoxy)diphenyl sulfone dianhydride, as well as various mixtures thereof.

A preferred class of aromatic bis(ether anhydride)s included by formula (X) above includes compounds wherein T is of the formula (XII):

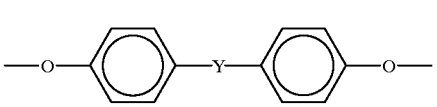

(XII)

and wherein each Y is independently selected from the group consisting of formulae (XIII):

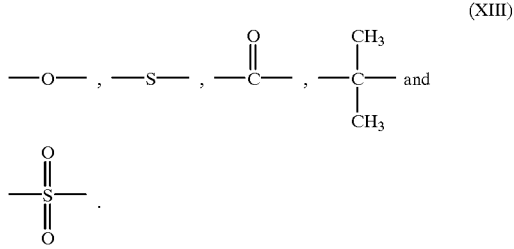

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XI) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 14-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Illustrative of a particularly preferred polyetherimide resin falling within the scope of formula (I) is one comprising repeating units wherein R is paraphenylene, metaphenylene, or mixtures of paraphenylene and metaphenylene and T is a group of the formula —O—Z—O— wherein Z has the formula (XIV):

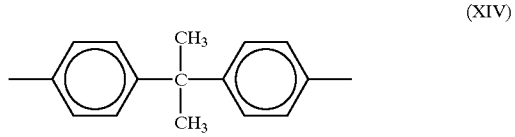

and wherein the divalent group (XIV) bridges the 3,3' positions of the aryl rings of the respective aryl imide moieties of formula (I).

In another embodiment, the polyetherimide resin may be a copolymer, a siloxane polyetherimide copolymer made by condensation of 2,2-bis(2,3-dicarboxy phenoxy phenol) propane dianhydride with metaphenylene diamine and an aminopropyl-terminated $D_{10}$ polydimethylsiloxane, containing 34 weight percent (wt %) structural units derived from the polydimethylsiloxane and having a molecular weight of about 60,000 grams per mole (g/mole).

Generally, useful polyetherimide resins have an intrinsic viscosity [η] greater than about 0.2 deciliters per gram, preferably of from about 0.35 to about 0.7 deciliters per gram measured in m-cresol at 25° C.

In a preferred embodiment, the polyetherimide resin of the present invention has a weight average molecular weight of from about 10,000 to about 150,000 g/mole, as measured by gel permeation chromatography, using a polystyrene standard.

During the formation of the emulsion, the polyetherimide resin is dissolved in a solvent capable of dissolving that particular polyetherimide resin. One example of a conventional solvent useful with the present invention is an organic solvent such as N-methylpyrolidone. Other conventional solvents capable of dissolving the polyetherimide resin can alternatively be employed.

As with the solvent, the cosolvent should be a solvent for polyetherimide, be a liquid at a temperature of 0° C., should be misible with the solvent over a large temperature range, i.e., up to about 150° C., with up to 250° C. preferred, and produce a ratio of solvent/cosolvent in the deposited coating of less than about 1. The cosolvent should be insoluble or only slightly soluble in water, preferably a solubility in water below about 5.5 grams per liter (g/l), in order to improve the emulsion stability and to obtain high throwing power properties (i.e. a mean voltage approaching zero, or a mean voltage of about zero) and to reduce water content in the deposited layers. Table 1 shows the immisibility point and coupling coefficient of the cosolvent for a 20 ml N-methylpyrrolidone-water (50/50) mixture with the coupling coefficient expressed as the amount of mixture divided by the amount of cosolvent necessary to obtain a heterogeneous mixture.

TABLE 1

| Cosolvent | Volume (ml) added to immiscibility point | Coupling Coefficient |
|---|---|---|
| 2-ethoxyphenol | 8.9 | 2.3 |
| methyl phenyl ether (anisole) | 1.5 | 13.3 |
| 2-methoxy phenyl acetone | 3.7 | 5.4 |
| acetophenone | 5.3 | 3.8 |

Preferably the cosolvent additionally has a coupling coefficient of about 3.7 or greater in N-methylpyrolidone. Possible cosolvents, include, but are not limited to, aromatic ethers, ketones, etherketones, arylallyl ketones, arylalkylketones, aryletheralcohols, ketones, phenols, and ether containing solvents, among others, with methyl phenyl ether (anisole) and 2-methoxy phenyl acetone preferred. As can be seen from Table 2, the stability of the emulsion correlates to the water solubility of the cosolvent; higher water solubility cosolvent produces a lower stability of the emulsion or incomplete emulsification.

TABLE 2

| | Stability | |
|---|---|---|
| Cosolvent | room temperature (RT) ° C. | 4° C. |
| 2-ethoxyphenol | Incomplete emulsification | |
| 2-ethoxy benzyl alcohol | Incomplete emulsffication | |

TABLE 2-continued

| Cosolvent | Stability | |
|---|---|---|
| | room temperature (RT) ° C. | 4° C. |
| methyl phenyl ether (anisole) | 7 days | 18 days |
| 2-methoxy phenyl acetone | 4 days | 10 days |
| Acetophenone | 2 days | 7 days |

Table 3 establishes the effects of the cosolvent on the yield of the polyetherimide in the final coating.

TABLE 3

| Co-solvent | acetophenone | Methylphenyl ether | 2-methoxy phenyl acetone |
|---|---|---|---|
| Modification Percentage | 70 | 70 | 70 |
| Quaternization Percentage | 50 | 50 | 50 |

| Voltage volts (V) | Time seconds (sec) | Yield milligrams per square centimeter (mg/cm$^2$) | | Yield (mg/cm$^2$) |
|---|---|---|---|---|
| 45 V | 20 | 1.1 | 1.3 | 1.4 |
| | 40 | 1.7 | 1.4 | 1.6 |
| | 60 | 2.1 | 1.5 | 1.8 |
| | 80 | 3 | 1.6 | 1.9 |
| 68 V | 20 | 1.5 | 1.4 | 1.6 |
| | 40 | 1.9 | 1.5 | 2.1 |
| | 60 | 2.8 | 1.6 | 2.3 |
| | 80 | 3.5 | 1.8 | 2.4 |
| 80 V | 20 | 0.9 | 1.3 | 1.6 |
| | 40 | 1.3 | 1.5 | 2 |
| | 60 | 2.1 | 1.8 | 2.3 |
| | 80 | 2.8 | 2.1 | 2.5 |
| 120 V | 20 | 1.9 | 1.3 | 2.1 |
| | 40 | 3.2 | 1.4 | 2.8 |
| | 60 | 4.4 | 1.8 | 3 |
| | 80 | 6 | 2 | 3.5 |

Table 4 illustrates the effect of cosolvent on final amperage (current at the end of the coating period) and the time necessary to approach zero.

TABLE 4

| Cosolvent | acetophenone | Methylphenyl ether | 2-methoxy phenyl acetone |
|---|---|---|---|
| Modification Percentage | 70 | 70 | 70 |
| Quaternization Percentage | 50 | 50 | 50 |
| Voltage (V) | Current density after 300 sec; of electrodeposition milliamperes per square centimeter (mA/cm$^2$) | | |
| 20 V | <0.5 [80] | <0.5 [40] | <0.5 [80] |
| 45 V | <0.5 [200] | <0.5 [45] | <0.5 [80] |
| 68 V | ~2 | <0.5 [50] | <0.5 [100] |
| 80 V | ~2 | <0.5 [55] | <0.5 [125] |
| 120 V | ~5 | <0.5 [125] | <0.5 [200] |

In the preparation of the emulsion, the anhydride groups of the polyetherimide are opened using a ring opening agent. This ring opening agent can be any compound capable of ring opening the imide groups of the polyetherimide, with amines preferred. These amines are secondary or tertiary amines which are misible with water, and have sufficiently high boiling points to avoid volatilization under standard preparation and storage conditions (i.e. about 1 atmosphere and 25° C.), with a boiling point above about 90° C. preferred and a boiling point above about 110° C. especially preferred. Preferably these amines additionally have hydrophilic groups, such as alcoholic groups. N-methylpiperazine is preferred, with 2-(1-piperazinyl)ethanol (HEP) especially preferred because they produce high polyetherimide yields, efficiently react with polyetherimide, and excess thereof is easily removed during curing of the polyetherimide coating.

The ring opening agent reacts with the anhydride groups of the polyetherimide to form functionalized amine-acid groups. The amine groups are quaternized using a neutralization agent. Neutralization agents include acids having a sufficient acid strength to attain the desired quaternization. Possible neutralization agents include, but are not limited to, mono-acids having an acid strength $K_a$ of about $10^{-5}$ or greater. Other acids can be employed however additional acid groups on the neutralization agent reduces the stability of the emulsion. Preferably lactic acid or glycolic acid is employed because the strong solvation of the counter ion of these acids induces an improved hydrophilic character resulting in migration to the water/solvent/cosolvent interphase, providing thereby a stable emulsion. Tables 5 and 6 show the improved stability yields of the emulsion and subsequently deposited coating when using lactic acid or glycolic acid as the neutralization agent.

TABLE 5

| | Degree of Quaternization (%) | | | |
|---|---|---|---|---|
| | 50 | | 100 | |
| Acid | room temp. (° C.) | 4° C. | room temp. (° C.) | 4° C. |
| propionic | Break down during the preparation | | | |
| glycolic | 4 days | 21 days | 2 days | 5 days |
| malonic | Break down during the preparation | | | |
| malaic (−) | Break down during the preparation | | | |
| tartaric (+) | Break down during the preparation | | | |
| citric | Break down during the preparation | | | |
| phophoric | Break down during the preparation | | | |
| Lactic | 2 days | 7 days | Break down . . . | |

TABLE 6

| Neutralization Agent | | Lactic acid | Glycolic acid |
|---|---|---|---|
| Modification Percentage | | 70 | 70 |
| Quaternization Percentage | | 50 | 60 |
| Voltage (V) | Time (sec) | Yield (mg/cm$^2$) | |
| 80 V | 20 | 0.9 | 1.5 |
| | 40 | 1.5 | 2.5 |
| | 60 | 2.3 | 3.4 |
| | 100 | 3.5 | 5.2 |
| 125 V | 20 | 1.6 | 2.2 |
| | 40 | 3.2 | 4.2 |
| | 60 | 4.4 | 6 |
| | 100 | 7.5 | 9.6 |

The preparation of the emulsion of the present invention is normally achieved by combining the components under conditions suitable for the formation of an emulsion. Suitable conditions include, for example, solution blending or melt mixing in signal or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

Essentially, under an inert atmosphere (i.e. nitrogen, argon, or another), a polyetherimide resin is preferably dissolved in a mixture of solvent and cosolvent, while heating the mixture. Although this process can be accomplished at room temperature (RT), heating the mixture is preferred in order to facilitate dissolution of the polyetherimide. After completion of dissolution, a ring opening agent is dissolved in a cosolvent and mixed into the dissolution. The dissolution is then preferably heated to a sufficient temperature, for a sufficient period of time to react the ring opening agent with the desired amount of anhydride groups of the polyetherimide to form amine groups. The desired amount of anhydride groups reacted with the ring opening agent is based upon the particular application, with reaction of substantially all of the anhydride groups possible, between about 50% and about 80% preferred, and about 60% to about 75% especially preferred.

After formation of the amine groups, a mixture of cosolvent and neutralization agent is added to quaternize the amine groups. The amount of neutralization agent utilized is based upon the desired amount of amine groups to quaternize. For example, to quaternize 50 vol. % of the amine groups, a 50 vol. % aqueous solution of the neutralization agent is mixed into the dissolution. Preferably, up to about 75% or more of the amine groups are quaternized, with about 42% to about 55% especially preferred. Finally, sufficient water, preferably demineralized water, is added to attain the desired percentage of polyetherimide in aqueous emulsion.

Note, it is preferred to mix the ring opening agent and neutralization agent in the cosolvent prior to addition to the dissolution, and to utilize some cosolvent in the dissolution in order to maintain and ensure emulsion stability. Solvent can be utilized in conjunction with or instead of the cosolvent so long as the solvent:cosolvent ratio is maintained below about 1; at ratios above about 1 the emulsion becomes unstable.

Once the emulsion is prepared, the fibers can be impregnated with the emulsion utilizing a cataphoretic electrodeposition process. The fibers can be woven or non-woven fabrics, unidirectional tapes, random fiber sheets, among others having any length or diameter desired to form the particular component. Possible fibers include any conductive fiber compatible with the emulsion, including coated fibers, with glass fibers, carbon fibers, and mixtures thereof preferred, such as a metal coated glass fiber/fabric. Possible coatings include conductive coatings such as metal coatings, including, but are not limited to, nickel, iron, steel, copper, and others, and alloys thereof.

Prior to impregnation of the fibers it is preferred to pretreat the fibers. Pretreatment of the fibers improves coating adhesion and therefore the mechanical properties of the final composite and facilitates homogeneous thickness of the wetted layers. Possible pretreatments include, but are not limited to, pretreating the fibers with good solvents for the polyetherimide, such as N-methylpyrrolidone and chloroform, among others. One possible pretreatment method comprises rinsing or soaking the fibers in the solvent.

Impregnation of the fibers with the polyetherimide aqueous emulsion then comprises inserting an anode, i.e. a stainless steel or other rod, and the fibers (cathode) into the emulsion and applying a voltage. The voltage can be up to about 100 volts (V), with about 20 V to about 60 V preferred. As can be seen from Tables 7 and 8, the voltage applied directly effected the yield and the wetting/impregnation quality.

TABLE 7

| | Voltage (V) | | | |
| --- | --- | --- | --- | --- |
| | 20 | 40 | 60 | 80 |
| Deposited Mass (mg/cm$^2$) | 7.5 | 13.1 | 22.5 | 25 |

TABLE 8

| Voltage (V) | Deposition Time (sec) | Yield (mg/cm$^2$) | Wetting Quality |
| --- | --- | --- | --- |
| 20 | 360 | 11.4 | weak |
| 40 | 180 | 13.1 | fair |
| 60 | 100 | 13.1 | good |
| 80 | 60 | 12 | very good |

After completion of the deposition process, the impregnated fabric was rinsed, such as with de-ionized water or other inert liquid, to remove any organic substances which may be present. Once rinsed, the polyetherimide can be cured at elevated temperatures. The temperature should be sufficient to cure the polyetherimide within the cure period, while not adversely effecting the fibers. Typically, the temperature is between about 250° C. and 300° C. for up to about 30 minutes, with about 15 minutes to about 20 minutes preferred.

EXAMPLE

The following example has been used to produce polyetherimide coated fibers of the present invention using the stable polyetherimide emulsion.

In a 500 milliliter (ml) reaction flask 80 grams (g) of polyetherimide resin made by condensation of 2,2-bis(2,3-dicarboxy phenoxy phenol)propane dianhydride with metaphenylene diamine and having a weight average molecular weight of about 55×10$^3$ g/mole was dissolved in 160 ml N-methyl pyrolidinone and 20 ml cosolvent by stirring the mixture while heating to between 85° C. to 95° C. under a nitrogen environment. Once the polymer was dissolved 18.9 g ring opening agent and 60 ml cosolvent were added at a rate of 1 ml /min. while vigorously stirring and maintaining the temperature between 85° C. to 95° C. After the addition, the mixture was heated to 110° C. for two hours to form a 70% amine modified polymer solution.

Next, 50 vol % of the amine groups were quaternized via stirring 19.9 g cosolvent and an equal molar amount of a 50% aqueous solution of the neutralization agent (i.e., 4.2 g. of a 50% aqueous solution of glycolic acid) into 100 g of the polymer solution. A 6 wt % polyetherimide aqueous emulsion was then formed by slowly adding 259.9 g of demineralized water to the quaternized solution.

Electrodeposition of the polyetherimide aqueous emulsion comprised inserting a stainless steel rod (anode) and carbon fiber fabric (cathode) into the emulsion, and applying a voltage.

After deposition process, the impregnated fabric was rinsed with deionized water and cured at elevated temperatures, between about 250° C. and 300° C. for 15 to 20 minutes.

Tables 9 and 10 show improved stability and yields of the emulsion and subsequently deposited coating using HEP as the ring opening agent compared to a standard ring opening agent (N-methylpiperazine (NMP)).

TABLE 9

| Amine Modifier | NMP | HEP |
|---|---|---|
| Modification Percentage | 70 | 70 |
| Quaternization Percentage | 50 | 50 |
| Stability @ Room Temperature | 2 days | 4 days |
| Stability @ 5° C. | 7 days | 15 days |

TABLE 10

| Amine modifier | | NMP | HEP |
|---|---|---|---|
| Modification Percentage | | 70 | 70 |
| Quaternization Percentage | | 50 | 50 |
| Voltage (V) | Time (sec) | Yield (mg/cm$^2$) | |
| 20 V | 20 | 0.52 | 0.78 |
|  | 40 | 0.71 | 1.12 |
|  | 60 | 0.9 | 1.42 |
|  | 100 | 1.3 | >2.0 |
| 68 V | 20 | 1.4 | 1.5 |
|  | 40 | 2.1 | 2.5 |
|  | 60 | 2.9 | 3.6 |
|  | 100 | 2.5 | 5.7 |
| 80 V | 20 | 0.9 | 1.6 |
|  | 40 | 1.5 | 2.4 |
|  | 60 | 2.2 | 3.2 |
|  | 100 | 3.4 | 4.7 |
| 125 V | 20 | 1.8 | 2.4 |
|  | 40 | 3.3 | 3.9 |
|  | 60 | 4.6 | 5.3 |
|  | 100 | 7.4 | 8.2 |

Table 11 shows the solvent and water content of the polyetherimide coatings. As is evident from the table, the solvent:cosolvent ratio is below 1, with a low water content. Low amounts of water result in improved throwing power, as the conductivity of the polyetherimide coating decreases, while a low solvent:cosolvent ratio indicates a preference of cosolvent deposition, thereby readily enabling the production of improved coatings since the cosolvent more readily volatilizes during cure of the coating, producing a substantially uniform, adherent coating.

TABLE 11

| Solvent/Cosolvent combination | Solvent (wt %) | | Ratio NMP/ cosolvent | Water % |
|---|---|---|---|---|
|  | NMP | cosolvent | | |
| NMP/methyl phenyl ether (anisole) | 1.19 | 9.33 | 0.13 | 1.02 |
| NMP/2-methoxy phenyl acetone | 0.76 | 8.43 | 0.09 | 1.03 |
| NMF/acetophenone | 0.78 | 4.82 | 0.16 | 2 |

Table 12 shows typical mechanical properties of carbon fiber polyetherimide composites (each composite comprises 50 vol % fibers and 50 vol % polyetherimide formed by laminating 26 woven fabric layers) made by the cataphoretic electrodeposition process described in the above example.

TABLE 12

| Property | Unit | Value |
|---|---|---|
| Flexure Modulus | GPa (giga-pascals) | 45 |
| Flexure Strength | MPa (mega-pascals) | 850 |
| Compression Modulus | GPa | 54 |
| Compression Strength | MPa | 53 |
| Moisture Absorption (after 24 hours) | percentage | 0.3–0.5 |

The fiber polyetherimide composite of the present invention enables simplified, inexpensive environmentally friendly production of complex geometry fiber reinforced components having good mechanical properties.

We claim:

1. A cataphoretic electrodeposition process for forming a polyetherimide coated fibers, comprising the steps of:

forming a polyetherimide emulsion, comprising the steps of:

dispersing a polyetherimide resin in a solvent and a substantially water insoluble cosolvent, said polyetherimide resin having anhydride groups;

reacting a ring opening agent with said anhydride groups to form amine groups;

neutralizing said amine groups with a neutralization agent to form a quaternized mixture;

forming the polyetherimide emulsion by adding water to said quaternized mixture;

inserting an anode into said emulsion;

inserting fiber preform into said emulsion, wherein said fiber preform functions as a cathode;

applying an electrical current to said emulsion;

forming a polyetherimide cation; and reacting said polyetherimide cation at said cathode to form an insoluble polyetherimide species which coats said fibers.

2. The cataphoretic electrodeposition process of claim 1, wherein said polyetherimide resin comprises structural units of the formula (I):

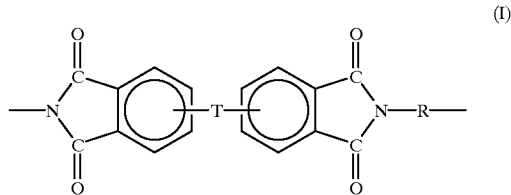

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

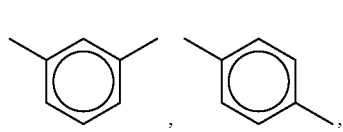

-continued

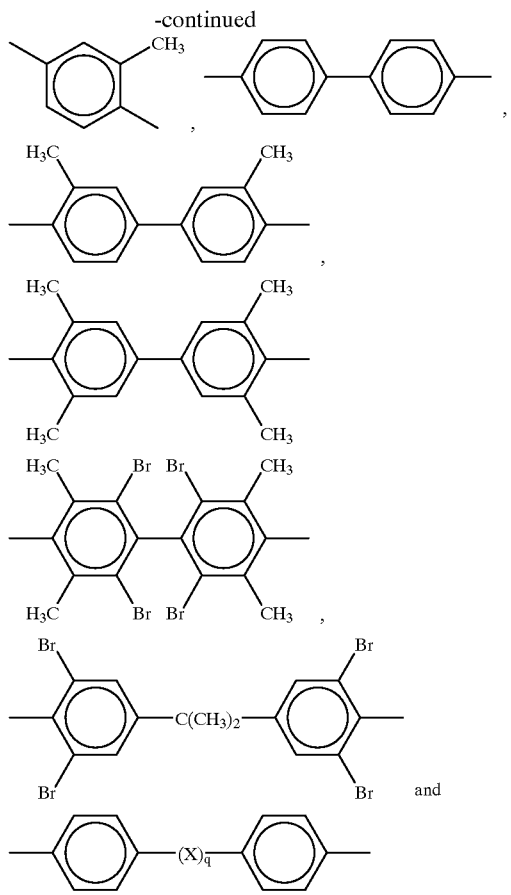

wherein X is a member selected from the group consisting of divalent radicals of the formulae (III):

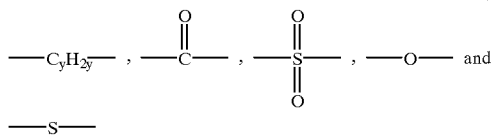
(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

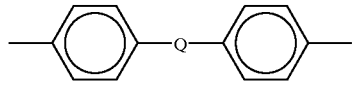
(IV)

where Q is a member selected from the group consisting of formulae (V):

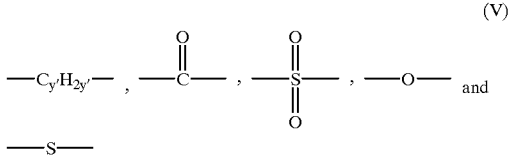
(V)

where y' is an integer from about 1 to about 5.

3. The cataphoretic electrodeposition process of claim 1, wherein said polyetherimide resin comprises the reaction product formed by melt polymerization of 2,2-bis[4-(3,4-dicarboxyphenoxy)phenyl]propane dianhydride with metaphenylene diamine.

4. The cataphoretic electrodeposition process of claim 1, wherein said solvent and said cosolvent each have a solubility in water of less than about 5.5 g/l.

5. The cataphoretic electrodeposition process of claim 1, wherein said solvent is N-methyl pyrolidinone.

6. The cataphoretic electrodeposition process of claim 1, wherein said cosolvent is a ketone, phenol or ether solvent.

7. The cataphoretic electrodeposition process of claim 1, wherein said cosolvent is anisole.

8. The cataphoretic electrodeposition process of claim 1, wherein said opening agent is anine.

9. The cataphoretic electrodeposition process of claim 8, wherein said opening agent is a secondary or tertiary amine.

10. The cataphoretic electrodeposition process of claim 1, wherein said opening agent is N-methylpiperazine or 2-(piperazinyl)ethanol.

11. The cataphoretic electrodeposition process of claim 1, wherein said neutralization agent has an acid strength, $K_a$, of greater than about $10^{-5}$.

12. The cataphoretic electrodeposition process of claim 1, wherein said neutralization agent is a mono-acid.

13. The cataphoretic electrodeposition process of claim 1, wherein said neutralization agent is lactic acid or glycolic acid.

14. The cataphoretic electrodeposition process of claim 1, wherein said emulsion comprises up to about 10 volume percent (vol %) polyetherimide resin, up to about 5 vol % ring opening agent, up to about 5 vol % neutralization agent, up to about 20 vol % solvent, up to about 20 vol % cosolvent, balance water.

15. The cataphoretic electrodeposition process of claim 1, wherein said emulsion comprises about 3 vol % to about 8 vol % polyetherimide resin, about 0.2 vol % to about 3 vol % ring opening agent, about 0.3 vol % to about 3.5 vol % neutralization agent, about 8 vol % to about 15 vol % solvent, about 9 vol % to about 15 vol % cosolvent, balance water.

16. The cataphoretic electrodeposition process of claim 1, wherein said emulsion comprises about 4 vol % to about 7 vol % polyetherimide resin, about 0.5 vol % to about 1.5 vol % ring opening agent, about 0.5 vol % to about 2 vol % neutralization agent, about 10 vol % to about 13 vol % solvent, about 10 vol % to about 12.5 vol % cosolvent, balance water.

17. The cataphoretic electrodeposition process of claim 1, wherein the polyetherimide resin comprises a copolymer made by condensation of 2,2-bis(2,3-dicarboxy phenoxy phenol)propane dianhydride with metaphenylene diamine and an aminopropyl-terminated $D_{10}$ polydimethylsiloxane.

18. The cataphoretic electrodeposition process of claim 1, wherein said fiber preform comprises woven fabrics, non-woven fabrics, unidirectional tapes, and random fiber sheets.

19. The cataphoretic electrodeposition process of claim 1, wherein said fiber preform comprises glass fibers, carbon fibers, or mixtures thereof.

20. The cataphoretic electrodeposition process of claim 19, wherein said fibers have a metal coating.

21. The cataphoretic electrodeposition process of claim 20, wherein said metal coating is nickel, iron, steel, or an alloy thereof.

22. The cataphoretic electrodeposition process of claim 1, further comprising reacting about 50% to about 80% of said anhydride groups with said ring opening agent.

23. The cataphoretic electrodeposition process of claim 1, further comprising reacting about 60% to about 75% to about 75% of said anhydride groups with said ring opening agent.

24. The cataphoretic electrodeposition process of claim 23, further comprising neutralizing about 42% to about 55% of said amine groups.

* * * * *